(12) United States Patent
Menon et al.

(10) Patent No.: US 8,775,681 B2
(45) Date of Patent: Jul. 8, 2014

(54) CROSS-NETWORK SYNCHRONIZATION OF APPLICATION S/W EXECUTION USING FLEXRAY GLOBAL TIME

(75) Inventors: Sandeep Menon, Shelby Township, MI (US); Thomas M. Forest, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 322 days.

(21) Appl. No.: 13/095,461

(22) Filed: Apr. 27, 2011

(65) Prior Publication Data
US 2012/0278507 A1 Nov. 1, 2012

(51) Int. Cl.
*G06F 15/16* (2006.01)
*H04L 12/66* (2006.01)
*H04L 12/40* (2006.01)
*H04J 3/06* (2006.01)

(52) U.S. Cl.
CPC ....... *H04L 12/66* (2013.01); *H04L 2012/40241* (2013.01); *H04L 2012/40215* (2013.01); *H04J 3/0682* (2013.01); *H04J 3/0655* (2013.01)
USPC ........................................................ 709/248

(58) Field of Classification Search
CPC ........... H04L 2012/40241; H04L 2012/40215; H04L 12/66; H04J 3/0682; H04J 3/0655
USPC ........................................................ 709/248
See application file for complete search history.

(56) References Cited

U.S. PATENT DOCUMENTS

| | | | |
|---|---|---|---|
| 7,586,953 B2* | 9/2009 | Forest et al. | 370/503 |
| 2010/0001770 A1 | 1/2010 | Bogenberger | |
| 2011/0160951 A1* | 6/2011 | Ishigooka et al. | 701/29 |
| 2011/0161524 A1* | 6/2011 | Na et al. | 709/248 |

FOREIGN PATENT DOCUMENTS

| | | | |
|---|---|---|---|
| DE | 10 2009 026 641 A1 | 12/2010 | |
| DE | 10 2010 023 070 A1 | 3/2011 | |

OTHER PUBLICATIONS

Woodroffe (Application and experience of CAN as a low cost OBDH bus system MAPLD, Washington D.C. USA, A.M. Woodroffe and P. Madle, Sep. 8-10, 2004, pp. 1-10).*
Somers (Brain Somers, "Investigation of a FlexRay—CAN Gateway in the Implementation of Vehicle Speed Control", A Dissertation submitted to the department of Engineering Technology of Waterford Institute of Technology in complete fulfillment of the requirements for the degree of Masters of Engineering. Jun. 2009, pp. 1-138).*
Internet Time Synchronization: The Network Time Protocol David L. Mills, Member, IEEE IEEE Transaction on Communications, vol. 39 No. 10 Oct. 1991, pp. 1482-1493.*
"A Case Study of Clock Synchronization in Flexray" by Alexander Hanzlik, Vienna University of Technology, Real-Time Systems Group,2006, pp. 1-9.*

(Continued)

*Primary Examiner* — John Macilwinen
(74) *Attorney, Agent, or Firm* — John A. Miller; Miller IP Group, PLC

(57) ABSTRACT

A system and method for implementing cross-network synchronization of nodes on a vehicle bus includes periodically sampling a notion of time from a first network, transmitting a message from the first network to a node on a second network, wherein the message includes the notion of time, and updating a local clock on the second network node based on the notion of time in the message.

14 Claims, 3 Drawing Sheets

(56) References Cited

OTHER PUBLICATIONS

B. Ngamwongwattana, Sync & Sense: VoIP Measurement Methodology for Assessing One-Way Delay Without Clock Synchronization, IEEE Transactions On Instrumentation and Measurement, vol. 59, pp. 1318-1326 ,No. May 5, 2010.*

John Regehr, CAN bus, pp. 1-31 ,link: http://www.eng.utah.edu/~cs5785/slides-f10/18-1up.pdf, Slide 11, 2010.*

Cwik et al. "Method for operating a data transfer system, data transfer system and computer product". Machine-translation of WO2010139504 A1, which was also published as DE102009026641 A1. Published Dec. 9, 2010. pp. 1-7.*

Dirks et al. "Method for transmitting time controlled message between network nodes, involves determining reference point in global time basis, adjusting time basis in network nodes, and adjusting another time basis in global time basis". Machine-translation of DE102010023070 A1. Published Mar. 31, 2011. pp. 1-9.*

Futoshi et al. "Data Repeater, Data Relaying Method, and Communication Network System". Machine-translation of JP 2009-027358. Published May 2, 2009. pp. 1-15.*

* cited by examiner

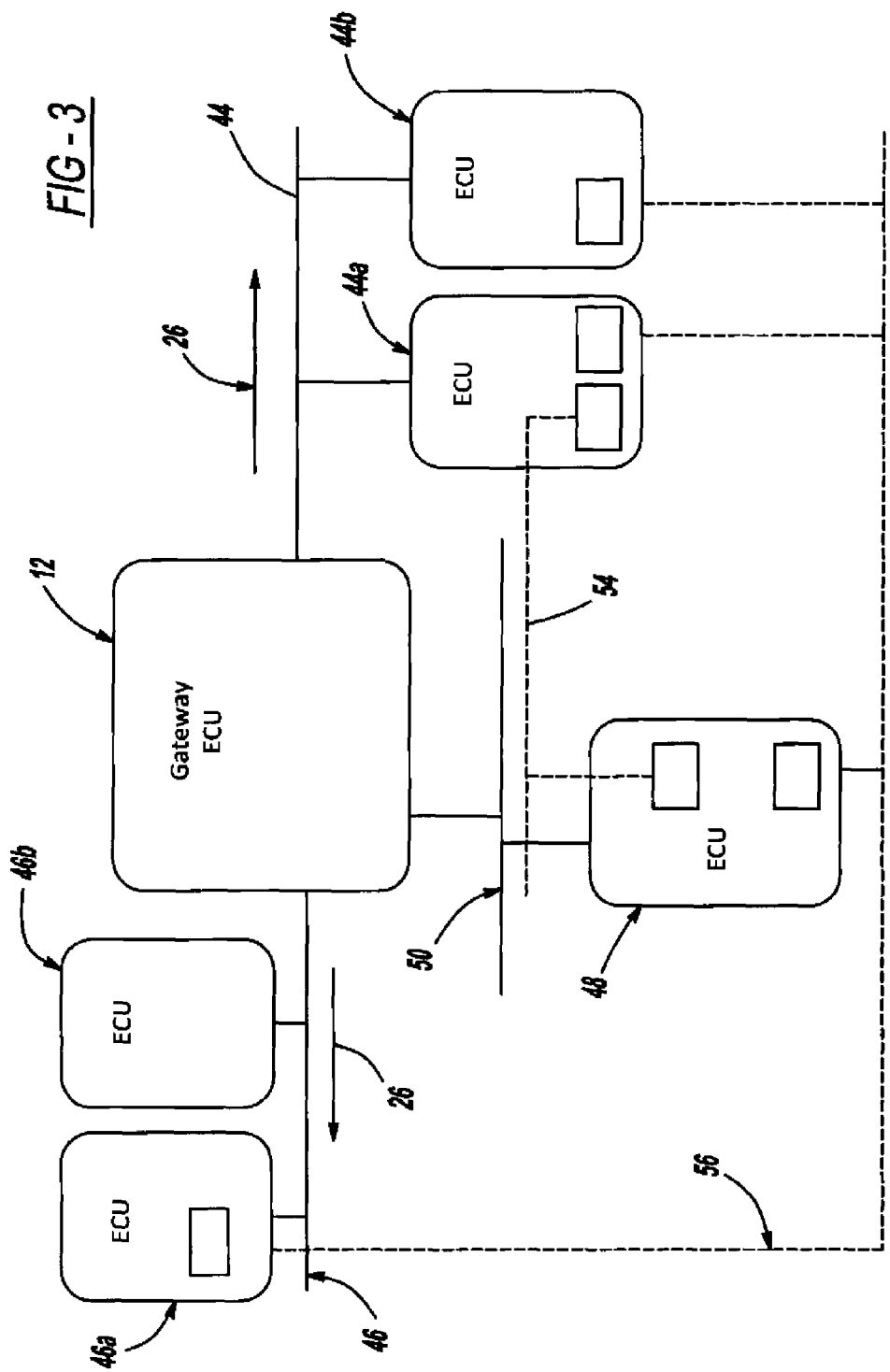

CROSS-NETWORK SYNCHRONIZATION OF APPLICATION S/W EXECUTION USING FLEXRAY GLOBAL TIME

BACKGROUND OF THE INVENTION

1. Field of the Invention

This invention relates generally to a system and method for implementing cross-network synchronization of application software on a vehicle communications bus and, more particularly, to a system and method for providing cross-network coordination and migration of electronic control units from domain-based time partitioning to time-synchronized partitioning.

2. Discussion of the Related Art

A modern automobile has numerous electronic control units (ECUs) configured to control various vehicle subsystems, such as the engine, transmission, airbags, antilock braking, cruise control, electric power steering, audio systems, windows, doors and mirror adjustments. Some of these subsystems are independent, while others need to exchange data among themselves during the normal operation of the vehicle. For example, the engine needs to tell the transmission what the engine speed is, and the transmission needs to tell other modules when a gear shift occurs. This need to exchange data quickly and reliably led to the development of the vehicle bus, which is a specialized internal communications network that interconnects components inside a vehicle using a standard protocol.

One of the first and most widely established vehicle bus protocols is the Controller-area Network (CAN or CAN-bus), which is a multi-master broadcast serial bus standard designed to allow microcontrollers and devices to communicate with each other within the vehicle. Each node (i.e., ECU) on the CAN-bus is able to send and receive messages, but not simultaneously. A message consists primarily of an ID that represents the priority of the message, and is transmitted serially onto the bus. This mechanism is referred to as priority based bus arbitration. Messages with numerically smaller values of ID have higher priority and are transmitted first. Due to speed restrictions, the devices that are connected by a CAN network are typically sensors, actuators, and other control devices. These devices are not connected directly to the bus, but through a host processor and/or a CAN controller. Although extremely reliable and robust, the CAN-bus is an event-triggered protocol, which is not be well-suited for applications that require synchronization and higher speed performance.

Addressing many of these short-comings is the newer FlexRay standard, which is a time-triggered protocol that provides options for deterministic data that arrives in a predictable time frame (down to the microsecond) as well as provides for CAN-like dynamic event-driven data to handle a large variety of frames. FlexRay accomplishes this hybrid of core static frames and dynamic frames with a pre-set communication cycle that provides a pre-defined space for static and dynamic data. While CAN nodes only need to know the correct baud rate to communicate, nodes on a FlexRay network must know how all the pieces of the network are configured in order to communicate.

As with any multi-drop bus, only one node can electrically write data to the bus at a time. If two nodes attempt to write at the same time, contention on the bus occurs and data becomes corrupt. There are a variety of schemes used to prevent contention on a bus. As mentioned above, CAN employs an arbitration scheme where nodes will yield to other nodes if they see a message with higher priority being sent on a bus. While flexible and easy to expand, this technique does not allow for very high data rates and cannot guarantee timely delivery of data. FlexRay on the other hand, manages multiple nodes with a Time Division Multiple Access (TDMA) scheme. Every FlexRay node is synchronized to the same clock, and each node waits for its turn to write on the bus. Because the timing is consistent in a TDMA scheme, FlexRay is able to guarantee determinism and the consistency of data delivery to nodes on the network. This provides many advantages for systems that depend on up-to-date data between nodes.

All devices on a communications bus generally include an internal local clock having a counter and an oscillator. The oscillator periodically generates an event, known as a microtick, which increases the counter. The counter can be modified by an adjustment value to increase or decrease the speed of the local clock. In time-triggered systems such as FlexRay, actions (e.g., messages, command signals) are derived from a synchronized global notion of time that is established between all network nodes. The concept of time is characterized using microticks and macroticks, wherein microticks correspond to local oscillator ticks and macroticks represent the global notion of time used to trigger an action. Each node generates a macrotick by selecting a number of microticks and synchronizes its macrotick by dynamically increasing or decreasing the number of microticks per macrotick in accordance with a clock state correction term delivered periodically by a clock synchronization algorithm. All nodes on the network adjust their local clocks at the same point in global time. The internally synchronized global time proceeds in units of macroticks, the counter for which represents the node's view of the global time.

FlexRay provides a deterministic, fault-tolerant, high-speed bus system suitable for advanced control applications. The CAN-bus on the other hand provides a reliable, robust and low cost alternative suitable for most other vehicle controls systems. Given the broad implementation and significant legacy costs associated with the CAN-bus in existing vehicles, it's unlikely that FlexRay networks will displace CAN systems anytime soon. To optimize cost and reduce transition challenges, the next generation of automobiles will likely contain FlexRay for high-end applications and CAN for mainstream powertrain communications so that FlexRay and CAN co-exist on the vehicle bus.

The systems and methods described hereinafter were developed in an effort to optimize the co-existence of multiple vehicle bus protocols, and in particular, to achieve cross-network coordination and migration of ECUs from domain based partitioning to time synchronized partitioning.

SUMMARY OF THE INVENTION

In accordance with the teachings of the present invention, a system and method are disclosed for implementing cross-network synchronization of nodes on a vehicle bus. The method includes periodically sampling a notion of time from a first network, transmitting a message from the first network to a node on a second network, wherein the message includes the notion of time, and updating a local clock on the second network node based on the notion of time in the message.

Additional features of the present invention will become apparent from the following description and appended claims, taken in conjunction with the accompanying drawings.

BRIEF DESCRIPTION OF THE DRAWINGS

The present embodiments will now be described, by way of example, with reference to the accompanying drawings, in which:

FIG. 3 illustrates an exemplary system model for time synchronization according to an embodiment.

DETAILED DESCRIPTION OF THE EMBODIMENTS

The following discussion of the embodiments of the invention directed to a system and method for implementing cross-network synchronization of application software on a vehicle communications bus is merely exemplary in nature, and is in no way intended to limit the invention or its applications or uses.

A system and method are provided for synchronizing the behavior of nodes on a CAN-link in ways that are not possible with the basic capabilities of the CAN protocol. The system and method described herein are configured to implement a global notion of time across nodes connected to a FlexRay network. As set forth above, all devices on FlexRay have a notion of a clock that progresses through a FlexRay cycle that ramps up and then starts up again. Thus, all nodes on the FlexRay network have a notion as to what time the network says it is and can coordinate activities based on that time globally rather than just that particular local node.

Figure 1:
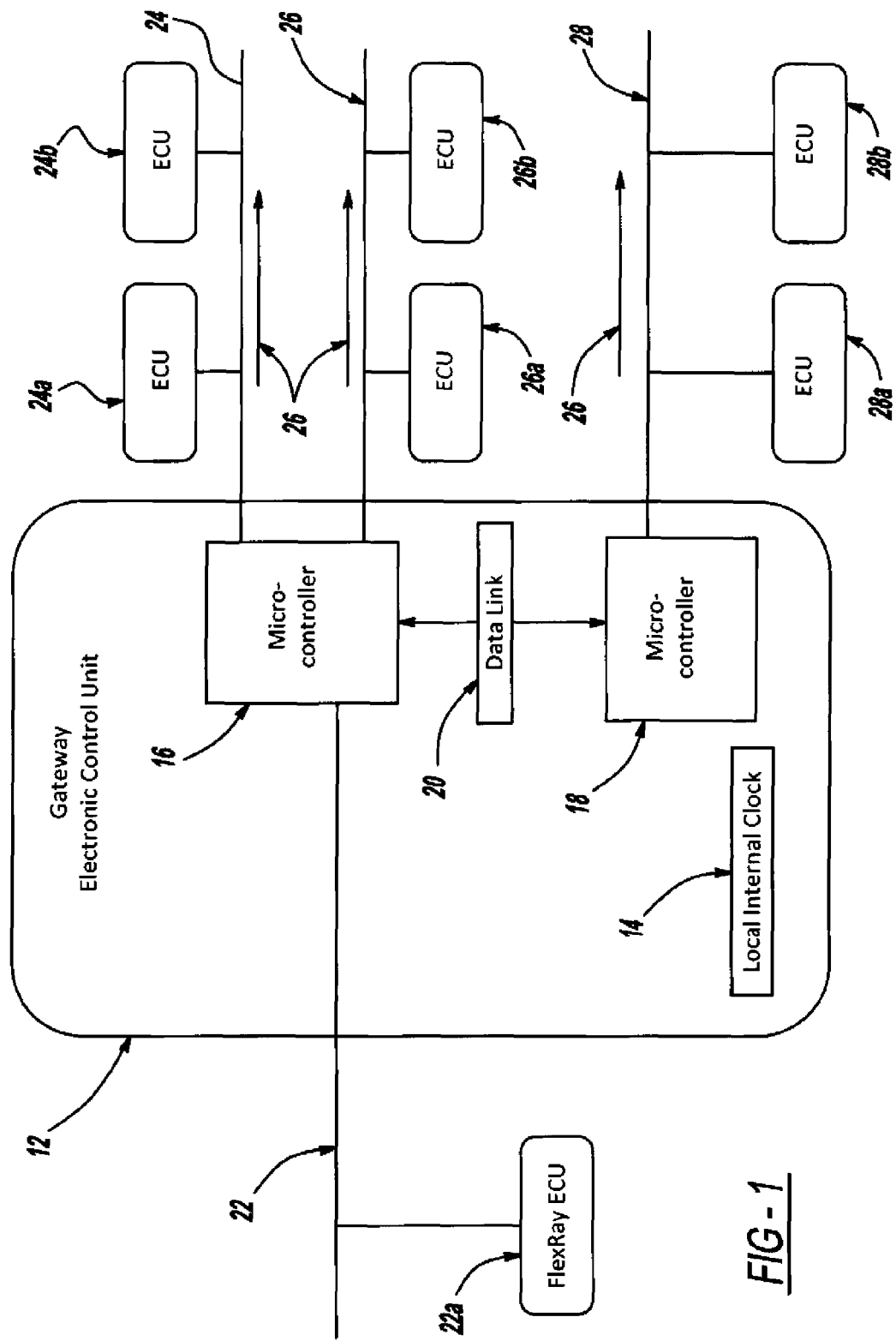
FIG. 1 illustrates an exemplary network communications system according to an embodiment.

FIG. 1 illustrates an exemplary network communications system 10 that includes a gateway electronic control unit (ECU) 12 having a local internal clock 14 and a first microcontroller 16 in communication with a second microcontroller 18 through a data link 20. The data link 20 may be any suitable link providing connection and data communication between the first and second microcontroller. In one example, the data link 20 is a serial peripheral interface (SPI) or a universal asynchronous receiver transmitter (UART). In another embodiment, the data link 20 may be a set of general purpose input/output pin arrangements configured to connect the first and second microcontrollers. Both of these pins can be output ports of the first microcontroller and connected to input ports on the second microcontroller. In other words, the first pin may be configured to trigger according to a mutually agreed upon periodic interval derived from the FlexRay time (i.e., between the first microcontroller and the second microcontroller). The second pin may be configured to indicate a rollover of the timer derived from the FlexRay time when the time synchronization (derived from FlexRay time) is reset to zero.

The first microcontroller 16 is electrically coupled to multiple networks including, but not limited to, a FlexRay network link 22, a first Controller-area Network (CAN) network link 24 and a second CAN network link 26. According to the embodiment shown in FIG. 1, the FlexRay network link 22 includes a FlexRay ECU 22a, the first CAN link 24 includes two ECUs, 24a, 24b and the second CAN link 26 includes another two ECUs 26a, 26b. The second microcontroller 18 in the gateway ECU 12 is coupled to a third CAN network link 28 having two ECUs 28a, 28b. One of ordinary skill in the art understands that the configuration shown in FIG. 1 is merely exemplary in that the specific number and electrical coupling of the ECUs may vary. Specifically, although the communications system 10 in FIG. 1 illustrates only one FlexRay link 24 associated with the gateway 12, and one ECU 24a externally connected to the FlexRay network 24, there can be any number of ECUs or other gateways. In addition, the network may also be configured with multiple gateways connected to any number of microprocessors, CAN links and ECUs. For example, in another exemplary embodiment, the system 10 may include two or more gateways, such that one gateway connects FlexRay to a first CAN network link, while another gateway connects FlexRay to a second CAN network link. In this configuration, synchronization is achieved between the first and second CAN network links because the FlexRay time synchronizes the operation of both gateways. In other words, devices connected to two or more separate CAN links can be synchronized by connection to two or more distinct gateways so long as the gateways are connected to a FlexRay network link.

According to one embodiment, the time synchronization properties of the FlexRay protocol are translated into CAN messages 26 that are configured to achieve synchronization of software execution between software functions in both FlexRay and CAN, and also between multiple CAN ECUs with the same domain or cross domain, as long as they share an ECU connected to a FlexRay cluster. In other words, a high priority (i.e., low numerical CAN-ID) periodic message 26 on CAN is transmitted by gateway ECU 12 to allow synchronization of timing and execution of software on the CAN network. Individual CAN-based ECUs use existing microcontroller timers as counters (i.e., local clocks) and make adjustments to the current notion of time based on the FlexRay global time data received via CAN. CAN-only ECUs receive the periodic CAN message 26 and synchronize its local notion of time, and further, interpolates the time until the arrival of the next CAN message.

Figure 2:
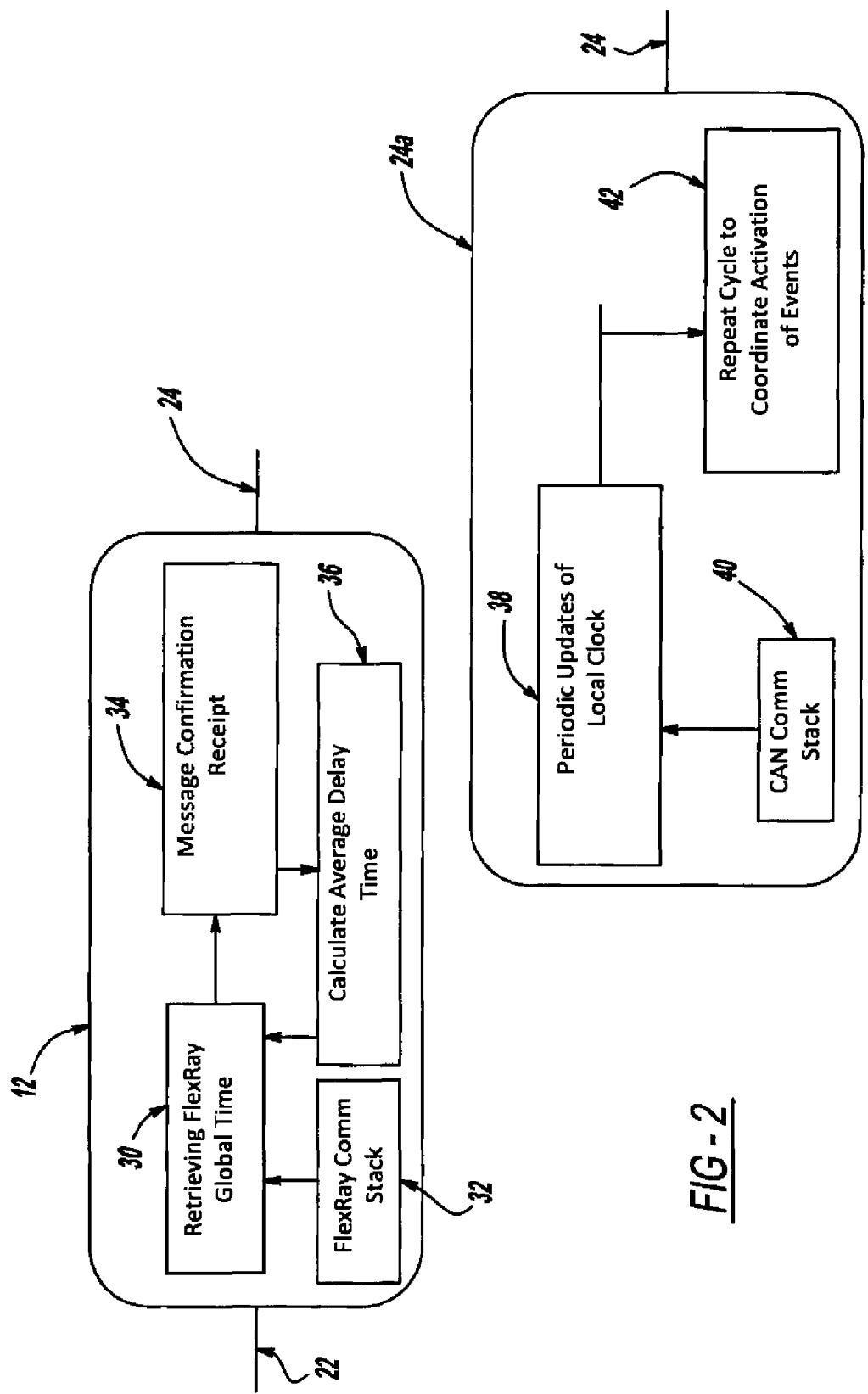
FIG. 2 illustrates an exemplary implementation of a time synchronization message according to the system of FIG. 1.

FIG. 2 illustrates an exemplary implementation of a time synchronization message according to an embodiment of the invention wherein the gateway ECU 12 is coupled to both a FlexRay link 24 and a CAN link such as the first CAN link 24 in FIG. 1. As previously set forth above, each FlexRay node maintains a global FlexRay time, which is generally a calculated average based on the notion of time from each FlexRay node connected to the FlexRay network. According to an embodiment, the gateway ECU 12 periodically samples (i.e., retrieves using a timer task every 50 msec) the FlexRay time from the FlexRay communications stack (e.g., FlexRay driver) that is local to the gateway ECU 12. The FlexRay global time is then transferred as a CAN signal to a CAN driver wherein the signal (i.e., message) includes a time adjustment to compensate for a predicted time delay for the message to be received by the CAN bus. This time delay may be referred to as a look-ahead time, which integrates timing offsets created due to CAN communication stack and bus arbitration delays associated with the time synchronization message. The time delay is essentially a running average of actual time delays that is calculated based on the time a message is sent to the CAN and the time at which the messages is confirmed as being received by the CAN.

Referring to the block diagram shown in FIG. 2, the process for generating a system-wide synchronized time message at the gateway ECU 12 includes at step 30, retrieving the FlexRay global time (FGT) from a FlexRay communications stack 32 and creating a message 26 that includes the FlexRay global time plus a timing offset (Time$_{LAT}$) referred to as a look-ahead time. In one embodiment, the look-ahead timing offset is calculated using a time filtering algorithm to predict communication protocol stack delays. For example, the delay (dTx$_i$) may be equal to the transmission time at the bus minus the generation time at the source. Thus, the average expected time delay is equal to the sum of the accumulated delays (dTx$_i$) divided by the number of delays. At step 34, a message confirmation receipt is received from the CAN ECU (for example, 24a) by the gateway ECU 12. The transmission time derived from the message confirmation receipt is used to calculate the transmission delay time, which is then used at step 36 to calculate the average delay time as described above.

In the CAN ECU 24a, at step 38 a timer task periodically updates (e.g., 2 msec) the local clock by computing the current global time based on the integration of the global time received in the synchronized time message sent on the CAN-bus and retrieved from a CAN communication stack 40. The local clock on the CAN ECU is then set to the global notion of time according to the FlexRay network. At step 42, this cycle is repeated periodically so that the CAN ECUs are able to coordinate the actuation of events based on the global notion of time and time stamp CAN received events.

One of ordinary skill in the art understands that the specific system configurations provided in FIGS. 1 and 2 are merely exemplary in that many other configurations and combinations of CAN and FlexRay devices are within the scope of the present invention. Specifically, the system and method described herein provide the capability to synchronize ECUs connected to two different CAN communication buses (e.g., buses 24, 26, and ECUs 24a, 26a) or to the same CAN Communication bus (e.g., 24a, 24b) if they are connected to a gateway module that connects to a FlexRay communication bus. The FlexRay global time message 26 can be created by the gateway module and transmitted onto the two different CAN buses. In other words, the ECUs 22a and 24a may be able to use a common notion of time to perform synchronized actuation, sensing or control. In yet another embodiment, one or more of the CAN buses may be cascaded such that there is a primary CAN bus and a secondary CAN bus. Thus, the message 26 transmitted onto the primary CAN bus may be used to synchronize a notion of time to nodes on the secondary CAN bus.

FIG. 3 illustrates an exemplary system model according to an embodiment of the invention. In this example, the gateway ECU 12 is connected to a first CAN-link 44 having first and second ECUs, 44a and 44b, and a second CAN-link 46 having third and fourth ECUs 46a and 46b. For illustration purposes, the gateway ECU 12 in this example may be used to control vehicle steering and stability such that ECUs 44a and 44b on the CAN-link 44 are used to control each of the front vehicle wheels, while ECUs 46a and 46b on the CAN-link 46 are used to control each of the rear vehicle wheels. The gateway ECU 12 is also connected to an ECU 48 through a FlexRay bus 50, which provides access to the FlexRay global time. Through periodic system-wide synchronized time messages 26 as described above with respect to FIGS. 1 and 2, the execution of commands to the individual vehicle wheels can be coordinated according to the global time. The execution of activities or commands may occur between any combination of devices including between FlexRay and CAN devices, or between independent CAN devices. For example, dotted line 54 represents synchronized execution between the FlexRay ECU 48 and a CAN ECU 44a. Similarly, dotted line 56 represents synchronized execution between independent CAN ECUs 44a, 44b and 46a.

The system described herein may be implemented on one or more suitable computing devices, which generally include applications that may be software applications tangibly embodied as a set of computer-executable instructions on a computer readable medium within the computing device. The computing device may be any one of a number of computing devices, such as a personal computer, processor, handheld computing device, etc.

Computing devices generally each include instructions executable by one or more devices such as those listed above. Computer-executable instructions may be compiled or interpreted from computer programs created using a variety of programming languages and/or technologies, including without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable media includes any medium that participates in providing data (e.g., instructions), which may be read by a computing device such as a computer. Non-volatile media includes, for example, optical or magnetic disks and other persistent memory. Volatile media include dynamic random access memory (DRAM), which typically constitutes a main memory. Common forms of computer-readable media include any medium from which a computer can read.

It is to be understood that the above description is intended to be illustrative and not restrictive. Many alternative approaches or applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that further developments will occur in the arts discussed herein, and that the disclosed systems and methods will be incorporated into such further examples. In sum, it should be understood that the invention is capable of modification and variation and is limited only by the following claims.

The present embodiments have been particular shown and described, which are merely illustrative of the best modes. It should be understood by those skilled in the art that various alternatives to the embodiments described herein may be employed in practicing the claims without departing from the spirit and scope of the invention and that the method and system within the scope of these claims and their equivalents be covered thereby. This description should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

All terms used in the claims are intended to be given their broadest reasonable construction and their ordinary meaning as understood by those skilled in the art unless an explicit indication to the contrary is made herein. In particular, use of the singular articles such as "a", "the", "said", etc. should be read to recite one or more of the indicated elements unless a claim recites an explicit limitation to the contrary.

What is claimed is:

1. A method for implementing cross-network synchronization of nodes on a vehicle bus, said method comprising:
   periodically sampling a notion of time from a first network wherein the first network includes a plurality of communication links, each link having at least one node;
   transmitting a message that includes the notion of time from the first network to a second network, wherein the second network includes a plurality of communication links, each link having at least one node;
   updating a local clock on the at least one node on the second network node based on the notion of time in the message;

wherein the first network is a FlexRay network and includes at least one gateway electronic control unit having at least one microprocessor configured to create a system-wide synchronized time message;

wherein the second network is a CAN network; and wherein the notion of time includes a timing offset to compensate for a delay associated with transmitting the message to the second network.

2. The method according to claim 1 wherein the first network is a FlexRay network and the second network is a CAN network, and wherein each node of the FlexRay network has a FlexRay notion of time.

3. The method according to claim 1 wherein the message is a system-wide synchronized time message.

4. The method according claim 1 wherein the message is configured to synchronize nodes from different links on the second network.

5. The method according to claim 1 wherein the first and second networks each include a plurality of nodes, each node including an electronic control unit.

6. The method according to claim 1 further including coordinating activities on the second network according to the notion of time.

7. The method according to claim 1 wherein the delay is an average delay calculated based on a receipt confirmation message received from the second network.

8. The method according to claim 7 further including updating the average delay calculation upon receipt of the confirmation message.

9. A system for implementing cross-network synchronization of nodes on a vehicle bus, said system including non-transitory computer-readable storage medium with an executable program stored thereon, wherein the program instructs a controller to:

periodically sampling a notion of time from a first network wherein the first network includes a plurality of communication links, each link having at least one node;

transmitting a message that includes the notion of time from the first network to a second network, wherein the second network includes a plurality of communication links, each link having at least one node;

updating a local clock on the at least one node on the second network based on the notion of time in the message;

wherein the first network is FlexRay network having a FlexRay notion of time and the second network is a CAN network; and wherein the message is a system-wide synchronized time message that includes a FlexRay notion of time plus a timing offset to compensate for a delay associated with transmitting the message to the second network.

10. The system according to claim 9 wherein the FlexRay network includes a first gateway electronic control unit and a second gateway electronic control unit, wherein the first gateway electronic control unit connects the FlexRay network to a first CAN network link and the second gateway electronic control unit connects the FlexRay network to a second CAN network link such that devices connected to the first CAN network link and devices connected the second CAN network link are synchronized to the FlexRay notion of time through the connection to the FlexRay network.

11. The system according claim 9 wherein at least one of the links on the CAN network is cascaded such that there is a primary CAN bus and a secondary CAN bus and wherein the message transmitted onto the primary CAN bus is used to synchronize a notion of time to nodes on the secondary CAN bus.

12. The system according to claim 9 wherein the message is a system-wide synchronized time message and wherein the notion of time is a global notion of time that is synchronized with a plurality of links on the second network such that activities on the second network are scheduled according to the global notion of time.

13. A method for implementing cross-network synchronization of nodes on a vehicle bus wherein one or more computing devices on the vehicle bus are coupled to a memory and programmed to execute instructions for:

periodically retrieving a FlexRay notion of time from at least one node on a FlexRay network;

creating a system-wide time synchronized message that includes a global notion of time;

transmitting the message to at least one node on a CAN network;

setting a local clock on the at least one CAN network node to the global notion of time; and wherein the global notion of time in the time synchronized message includes the FlexRay notion of time plus an average delay time that is calculated using a time filtering algorithm to predict communication protocol stack delays.

14. The method according to claim 13, wherein tasks on one or more links of the CAN network are scheduled according to the global notion of time.

* * * * *